United States Patent
Verma et al.

(10) Patent No.: US 7,072,912 B1
(45) Date of Patent: Jul. 4, 2006

(54) IDENTIFYING A COMMON POINT IN TIME ACROSS MULTIPLE LOGS

(75) Inventors: Surendra Verma, Bellevue, WA (US); Jonathan M. Cargille, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 382 days.

(21) Appl. No.: 10/293,158

(22) Filed: Nov. 12, 2002

(51) Int. Cl.
G06F 12/00 (2006.01)
G06F 17/30 (2006.01)
G06F 11/00 (2006.01)

(52) U.S. Cl. .................. 707/202; 707/200; 714/15; 714/16; 714/20

(58) Field of Classification Search .............. 707/8, 707/202–204, 200; 714/15, 16, 20
See application file for complete search history.

(56) References Cited

U.S. PATENT DOCUMENTS

| | | | |
|---|---|---|---|
| 4,893,318 A * | 1/1990 | Potash et al. | 375/358 |
| 5,499,367 A * | 3/1996 | Bamford et al. | 707/8 |
| 5,680,610 A * | 10/1997 | Smith et al. | 707/10 |
| 5,907,848 A * | 5/1999 | Zaiken et al. | 707/202 |
| 6,078,930 A * | 6/2000 | Lee et al. | 707/202 |
| 6,253,212 B1 * | 6/2001 | Loaiza et al. | 707/202 |

OTHER PUBLICATIONS

B. Gupta, S.K. Banerjee and B. Liu, "Design of New Roll-Forward Recovery Approach for Distributed Systems," IEE Proceedings-Computers and Digital Techniques, Published by IEE, United Kingdom, May 2002, vol. 149, No. 3, pp. 105-112.

* cited by examiner

*Primary Examiner*—Don Wong
*Assistant Examiner*—Cheryl M Schechtman
(74) *Attorney, Agent, or Firm*—Workman Nydegger

(57) ABSTRACT

Nodes in a distributed system maintain virtual times according to specified rules. Each node can associate its virtual time with transactional messages that are transferred to other nodes and with log entries that are written to a log. A reference entry, which corresponds to an arbitrary point in time, is selected from a first log associated with a first node. A reference virtual time associated with the reference entry is identified. A matching entry, with an associated virtual time that appropriately corresponds to the reference virtual time, is selected from a second log associated with a second node. The first node is caused to roll-forward to the arbitrary time by processing the first log up to the reference entry. The second node is caused to roll-forward to the arbitrary time by processing the second log up to the matching entry.

42 Claims, 7 Drawing Sheets

IDENTIFYING A COMMON POINT IN TIME ACROSS MULTIPLE LOGS

BACKGROUND OF THE INVENTION

1. The Field of the Invention

The present invention relates to rolling-forward through logs associated with a number of information stores to cause each information store to be in a consistent state with respect to the other information stores. More specifically, the present invention relates to systems, methods, and computer program product claims for identifying a common point in time across a number of the logs and rolling-forward in each log to the common point in time.

2. Background and Relevant Art

Computer systems and related technology affect many aspects of society. Indeed, the computer system's ability to process information has transformed the way we live and work. Computer systems now commonly perform a host of tasks (e.g., database management, scheduling, and work processing) that prior to the advent of the computer system were performed manually.

At times, a single task can involve modifying data stored at a number of individual storage locations. In some cases, data stored at one individual storage location is related to data stored at one or more other individual storage locations, such that it is important that all the related data be modified together. For example, when transferring funds from a first account at a first back to a second account at a second bank, data associated with the funds of the first account can be modified to debit the first account and data associated with the funds of the second account can be modified to credit the second account. Unfortunately, when modifying related data that is stored at different individual storage locations, there is always some possibility that the task being performed to modify the data might be interrupted (e.g., a user may halt performance of the task or a computer system fault may occur). This can result in some of the related data being modified, while other related data is not modified. When only some of the related data associated with a task is modified, the individual storage locations storing the modified data are often referred to as being in an "inconsistent state" with respect to the individual storage locations storing the unmodified data.

In some cases, data modification tasks are performed in a distributed system where modules (at the same computer system and/or at different computer systems) connected to a common infrastructure interoperate and communicate between one another in a manner that may be transparent to a user. These modules may modify data stored at different individual storage locations by communicating in the background to transfer user commands and program responses. Due to the increased complexity of distributed systems, including the possibility of multiple points of failure, there is an increased chance of a distributed system placing a number of different individual storage locations in an inconsistent state with respect to each other.

Identifying the cause of an inconsistent state often requires a level of technical expertise beyond that of the average user. Further, even if the cause of an inconsistent state is identified, it may require a significant amount of time for a user to transition a number of different individual storage locations out of the inconsistent state (e.g., by entering user commands to reverse the effects of previously performed data modifications). To reduce the chance that individual storage locations will have to be transitioned out of an inconsistent state by a user, individual storage locations are often backed-up (e.g., to tape media), at regular intervals (e.g. once a day, once a week, etc.).

A back-up can preserve the state of a number of different individual storage locations as of the time the back-up is performed. If, after a successful back-up (e.g., backing-up a number of different individual storage locations that are known to be in a consistent state), one or more individual storage locations transition into an inconsistent state, these individual storage locations can be returned to a consistent state by restoring data from the back-up. However, depending on the back-up interval, a significant amount of data may be lost when restoring from back-up. For example, if back-ups are performed every day at 11:00 PM and an individual storage location transitions into an inconsistent state at 10:00 PM, twenty-three hours of data may be lost when the individual storage location is restored from the last back-up.

To further reduce the problem of data loss then transitioning out of an inconsistent state, transactional systems can be utilized. A transactional system treats a number of related data modifications as a single atomic unit (commonly referred to as a "transaction"). That is, either all the related data modifications are performed or none of the related data modifications are performed. To help maintain this atomicity during a recovery, an entry for each related data modification is written to a log when the data modification is successfully completed. Thus, a log can be utilized to maintain a record of all the data modifications that occur between back-up intervals.

When all the related data modifications associated with a transaction are successfully completed, an entry can be written to the log indicating the transaction was "committed." When a committed transaction is subsequently lost (e.g., due to a computer system failure), log entries associated with the committed transaction can be processed to "redo" the related data modifications (commonly referred to as "roll-forward"). On the other hand, when all the related data modifications associated with a transaction do not complete, an entry can be included in the log indicating the transaction was "aborted." When a transaction is aborted, the log entries associated with any data modifications that were performed can be processed to "undo" these data modifications (commonly referred to as a "roll-back"). Thus, a log helps ensure that individual storage locations can be transition out of an inconsistent state with minimal loss of data.

To transition an individual storage location out of an inconsistent state, the most recent back-up is typically loaded and then a log associated with the individual storage location is rolled-forward to the desired recovery time. In some cases, when a number of storage locations are in an inconsistent state, a number of logs must be rolled-forward to the same desired recovery time. This can be problematic, as a number of individual storage locations may not have a common understanding of time.

Individual storage locations may have different clock settings, may operate in different time zones, or timing of individual storage locations may drift due to inevitable differences in the components of the individual storage locations. For example, a first individual storage location may indicate that one of a number of related data modifications occurred at 5:00 PM., while a second individual storage location indicates that another of the number of related data modifications occurred at 5:10 PM. Thus, rolling forward to 5:05 PM may result in the first and second individual storage locations being in an inconsistent state. Further, even if individual storage locations could be precisely synchronized, network conditions, such as, for example, differing transmission speeds, variable latencies or changing members of hops between individual storage locations can affect an individual storage location's perception of time.

Therefore, what are desired are systems, methods, and computer program products, for establishing a common understanding of time across a number of logs.

BRIEF SUMMARY OF THE INVENTION

The principles of the present invention provide for identifying log entries from a number of different logs that correspond to a common point in time. After the log entries are identified, the logs can be processed to cause a number of resource managers to roll-forward to the common point in time.

Performing a distributed transaction can include performing one or more data operations (e.g., file system and database operations) at different nodes of a distributed system. Transactional messages can be passed between nodes to coordinate the operations that are to be performed at each node. Some nodes of the distributed system can function as "transaction managers," managing the flow of transactional messages between nodes. Other nodes of the distributed system can function as "resource managers," managing the performance of data operations. When it is desirable to perform a particular transaction (e.g. when a command is received from a user and/or application program) a transaction manager can generate a transactional message that includes an indication of the data operations that are to be performed at each node. The transactional message can then be transferred (in some cases through one or more other transaction managers) to appropriate resource managers.

Each node in the distributed system can maintain a virtual clock value. When a node transfers a transactional message, the node can associate its virtual time value with the transactional message. For example, when a transaction manager generates a transactional message, the transaction manager may include a virtual time stamp indicating the transaction manager's virtual time value.

In some embodiments, nodes of a distributed system "maximize" their virtual clock values. That is, when a node receives a transactional message with a virtual time value less than or equal to the virtual time value of the node, the node does not update its virtual time value. On the other hand, when a node receives a transactional message with a virtual time value greater than the virtual time value of the node, the node can update its virtual time value to be equal to the virtual time value included in transactional message.

When a resource manager writes an entry to a log file (e.g., an entry for a commit decision) the virtual clock value of the resource manager can be associated with the entry, such as, for example, by including a virtual time stamp in the entry. After writing an entry to a log, a resource manager may increment its virtual clock value (e.g., by adding one to the current virtual clock value). Thus, a series of log entries can have increasing virtual time values and a chronological ordering of log entries is established. Since logs for multiple resource managers can be associated with virtual time values, a common point in time across multiple logs can more easily be identified.

To enable a number of individual stores to roll-forward to a common point in time, an arbitrary reference entry is selected from a first log associated with a first resource manager. The reference entry may be, for example, an entry for a commit decision that was made at the first resource manager. A reference virtual time value associated with the reference entry is identified, such as, for example, by accessing a virtual time stamp included in the reference entry. A matching entry, with an associated virtual time value that appropriately corresponds to the reference virtual time value, is selected from a second log associated with a second resource manager. Selecting a matching entry can include comparing the reference virtual time value to virtual time values associated with entries in the second log.

In some cases, an appropriately corresponding virtual time value may be a virtual time value that equals the reference time value. In other cases, an appropriately corresponding virtual time value may be the highest virtual time value that is less than the reference virtual time value. For example, when a reference virtual time value is 12, a virtual time value of 8 may be an appropriately corresponding time value if no other virtual time value in the second log is greater than 8 and less than 12. In still other cases, entries from a number of different logs (e.g., logs of other resource managers or transaction managers) are analyzed to determine an appropriately corresponding virtual time from the second log. This can occur, for example, when the second log file leaves the second resource manager "in-doubt" as to whether a transaction was actually committed.

After identifying a common point in time across multiple logs, the logs can be processed to restore a number of resource managers to a transactionally consistent state. This may be useful for causing the resource managers to roll-forward during a recovery or to prepare the resource managers for the purpose of a query. In some cases, a single computer system, such as, for example, a transaction manager controls the roll-forward process. The computer system can cause the first resource manager to roll-forward to the common point in time by processing the first log up to the reference entry. Similarly, the computer system can cause the second resource manager to roll-forward to the common point in time by processing the second log up to the matching entry.

In other cases, a reference resource manager causes a dependent resource manager to roll forward to a point in time that is selected by the reference resource manager. The reference resource manager selects a reference entry from a reference log. A virtual time associated with the reference entry is identified and sent to a dependent resource manager. The dependent resource manager receives the virtual time and identifies, from a dependent log, a matching entry that appropriately corresponds to the virtual time.

The reference resource manager is caused to roll-forward to the reference entry and the dependent resource manager is caused to roll-forward to the matching entry. The reference resource manager can roll-forward at any time after selection of the reference entry. However, in some cases the reference manager waits to receive verification that the dependent resource manager has located a matching entry.

Associating virtual times with log entries enables a common point in time to be identified across a number of logs. Further, the perceived actual times at different nodes in a distributed system have little, if any, effect on identifying the common point in time.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that those drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
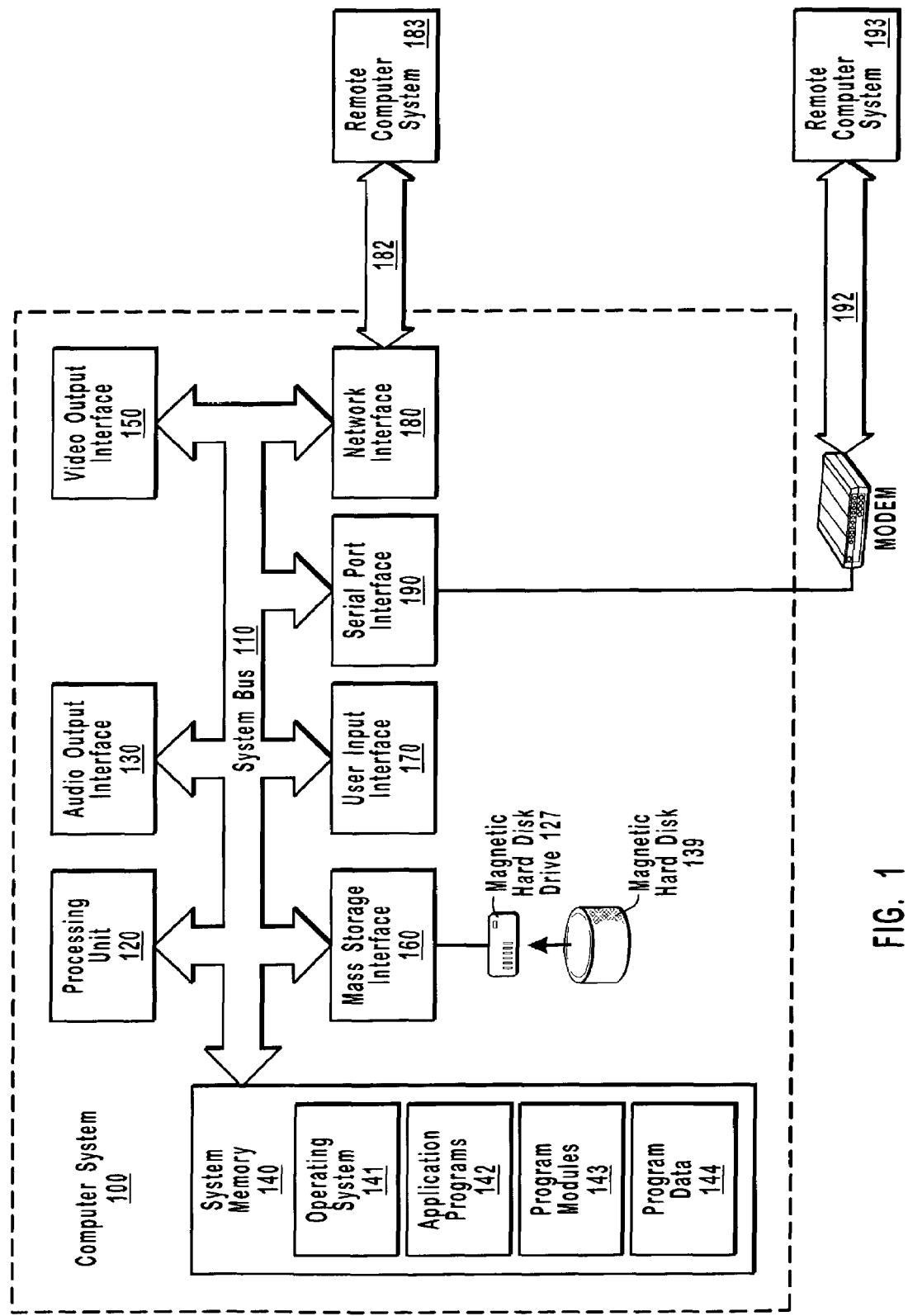
FIG. 1 illustrates an example of a computer system that provides a suitable operating environment for the present invention.

The present invention extends to systems, methods, and computer program products for identifying a common point in time across a plurality of logs. Each node in a distributed system maintains a virtual time according to specified rules. In some embodiments, these rules specify that nodes always maximize their virtual time values and that a node's virtual time value is incremented after a log entry is written to a node's log. A virtual time stamp can be included in a log entry to record the virtual time an operation identified in the log entry was performed. During a roll-forward recovery involving logs for a plurality of nodes, an entry from each log corresponding to a desired reference virtual time can be identified. Each node can then roll-forward through a corresponding log to the appropriate log entry corresponding to the reference virtual time.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that may enable the transport of electronic data between two entities such as computer systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Logical communication links may include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, firewalls, or gateways. Logical communication links may also include portions of a Virtual Private Network ("VPN").

In this description and in the following claims, a "transaction manager" is defined as a node in a distributed system that managers the flow of transactional messages between other nodes (including other transaction managers) in the distributed system. A transaction manager can also receive user and/or application program commands indicating that a transaction is to be performed (hereinafter referred to as "transaction initiation commands"). In response to receiving transaction initiation commands, a transaction manager can generate transactional messages appropriate for causing the transaction to be performed. The transaction manager can send these generated transactional messages to other nodes in the distributed system where resources necessary to perform the transaction are located.

In this description and in the following claims, a "resource manager" is defined as a node in a distributed system that manages access to resources. A resource manager can receive transactional messages generated by a transaction manager (and that may been transferred through one or more other transaction managers) requesting access to resources managed by the resource manager. A resource manager can also generate transactional messages indicating whether the resource manager will respond according to a transaction manager's request. The resource manager can send these transactional messages to a transaction manager that requested access to resources managed by the resource manager.

In this description and in the following claims, a "transaction" is defined as a unit of interaction with one or more resources that is treated in a consistent and reliable way independent of other transactions. A single transaction can cause one or more operations to be performed on one or more resources that are managed by one or more resource managers. For example, a single transaction can cause a first file to be created and a second file to be deleted at a first resource manager, two rows of a database to be modified and a third file deleted at a second resource manager, and a fourth file to be modified at a third resource manager.

A transaction is executed consistently and reliably if the execution includes the following properties: 1) Atomicity, the transaction is executed fully or not at all, 2) Consistency, the transaction takes the accessed data from one consistent state to another consistent state, 3) Isolation, no transaction may see (or modify) the state of a resource accessed by another transaction until the other transaction has finished accessing that resource, and 4) Durability, once a transaction commits, its modifications are permanent.

In this description and in the following claims, a "transactional message" is defined as a message that includes data associated with a transaction.

In this description and in the following claims, an "atomic commit protocol" (hereinafter referred to as an "ACP") is defined as any protocol that maintains the atomicity of transactions. That is, even though a transaction may be associated with performing operations on a plurality of resources, some of which might fail, the effect of the transaction is that either all operations are committed or all operations are aborted. In a distributed system, an ACP may utilize transactional messages to facilitate communication between the nodes of the distributed system.

In this description and in the following claims, a "two-phase commit protocol" protocol is defined as an atomic commit protocol that maintains the atomicity of transactions by executing a transaction in two phases, a prepare phase and a commit phase. In a prepare phase, a transaction coordinator (e.g., a transaction manager) identifies what resources are necessary to a transaction and what nodes (e.g., resource manager) should be contacted to access the necessary resources. The transaction coordinator can then attempt to contact the nodes by sending a prepare transactional message (hereinafter referred to simply as a "prepare message") requesting that the nodes commit to performing an operation on the necessary resource according to the transaction.

Nodes that are in a state (or that subsequently transition into a state) capable of performing operations requested in a prepare message, indicate this capability to the transaction coordinator by sending a prepare complete transactional message (hereinafter referred to simply as a "prepare complete message") to the transaction coordinator. A prepare complete message can further indicate that a node will remain in a state capable of applying the requested operations even if the node subsequently fails. When all the contacted nodes (i.e., each node that was sent a prepare message) respond with prepare complete messages, the transaction coordinator can then proceed to a commit phase. However, if any node does not respond or responds that it is not capable of performing operations according to the transaction, the transaction coordinator may abort the transaction. Alternately, the transaction coordinator can attempt to contact another node with access to the necessary resource (by sending a prepare message to the node) to request performance of the operations that would otherwise have been performed by the non-responsive or negatively responding node.

In a commit phase, the transaction coordinator sends a commit transactional message (hereinafter referred to as a "commit message") to all nodes involved in the transaction (i.e., any node from which the transaction coordinator received a prepare commit message). Reception of a commit message causes a node (e.g. a resource manager) to perform any operations that were indicated as being prepared in the corresponding prepare complete message. A node can also write appropriate log entries for any performed operations to a log, including a commit entry. After a node successfully performs the indicated operations, the node sends a commit complete transactional message (hereinafter referred to as a "commit complete message") to the transaction coordinator. After receiving commit complete messages from all contacted nodes (each node that was sent a commit message), the transaction coordinator can advance its beginning of log past the commit record. Alternately, the transaction coordinator can also write a forget record to the log.

Those skilled in the art will appreciate that the invention may be practiced in network computing environments with many types of computer system configurations, including personal computers, laptop computers, hand-held devices, multi-processor systems, microprocessor-based on programmable consumer electronics, network PCs, minicomputers, mainframe computers, mobile telephones, PDAs, pagers, routers, gateways, firewalls, proxies, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

It may be that a computer system is configured to function as both a transaction manager and a resource manager. For example in a distributed system, a computer system may both manage the flow of transactional messages to other nodes and manage access to resources associated with the computer system. It may also be that a computer system is configured to include a plurality of resource managers. For example, a computer system may include a first resource manager to manage the resources of a file system and a second resource manager to manager the resources of a database. In this configuration, the computer system may receive transactional messages requesting access to resources managed by the first resource manager and/or second resource manager.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 can also include video output interface 150, which provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules and other data for computer system 100. For example, magnetic hard disk 139 can store one or more program modules including operating system 141, application programs 142, other program modules 143, and program data 144. Although the example environment described herein employs magnetic hard disk 139, other types of computer-readable media (and corresponding drives) for storing data can be used, including removable magnetic disks, optical disks, removable optical disks, magnetic cassettes, flash memory cards, digital versatile disks, Bernoulli cartridges, RAMs, ROMs, and the like.

Computer system 100 can be network connectable to networks, such as, for example, an office-wide or enterprise-wide computer network, an intranet and/or the Internet. Computer system 100 can exchange data with external sources, such as, for example, remote computer systems and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. Remote computer system 183 can be an electronic messaging server that receives and stores electronic messages for recipients, including recipients that utilize computer system 100 to access electronic messages.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. Remote computer system 193 can be an electronic messaging server that receives and stores electronic messages for recipients, including recipients that utilize computer system 100 to access electronic messages.

Alternatively, computer system 100 can exchange data with external sources through other interfaces, such as, for example, a parallel port, a game port, or a universal serial bus ("USB") port.

It should be understood that the described network connections are merely examples. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, virtual clock modules, resource managers, and transaction managers as well as associated data, including transactional messages, logs, log entries, virtual time stamps, virtual time values, file systems and databases may be stored and accessed from any of the computer-readable media associated with computer system 100. For example, portions of such modules and portions of associated program data may be included in operating system 141, application programs 142, program modules 143 and/or program data 144, for storage in system memory 140. When a mass storage device, such as, for example, magnetic hard disk 139, is coupled to computer system 100, such modules and associated program data may also be stored at the mass storage device.

In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
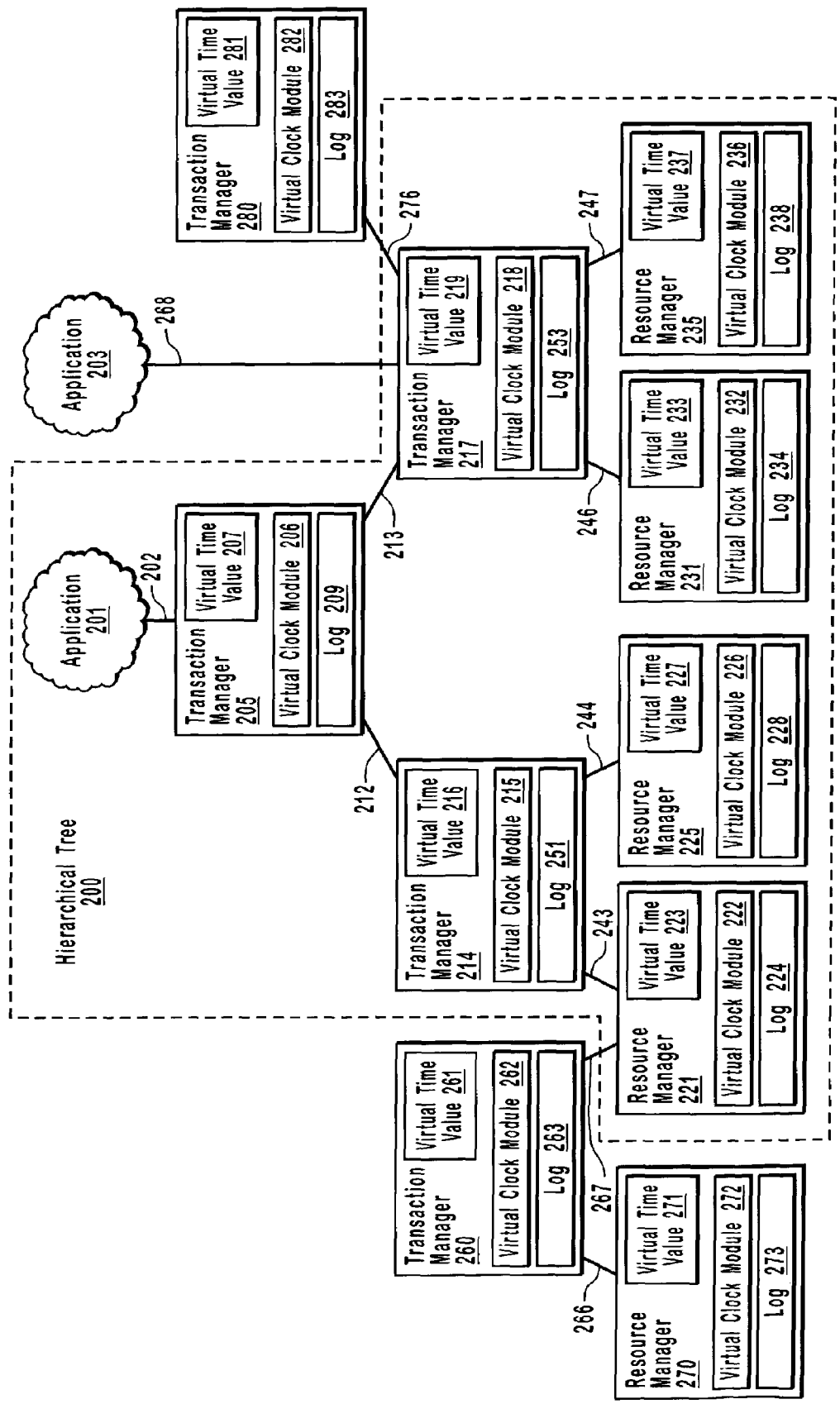
FIG. 2 illustrates an example of some of the functional components that can facilitate associating virtual times with log entries.

FIG. 2 illustrates some of the functional components that can facilitate associating virtual times with log entries. Shown in FIG. 2 are transaction managers 205, 214 and 217, which can manage the flow of transactional messages between application 201 and resource managers 221, 225, 231 and 235. Transaction managers and resource managers (hereinafter collectively referred to as "nodes") can be arranged hierarchically as illustrated by hierarchical tree 200. Transactional messages can be transferred down from higher-level nodes (e.g., transaction manager 205), through one or more intermediate nodes (e.g., transaction managers 214 and 217), to lower-level nodes (e.g., resource managers 221, 225, 231, and 235). Likewise, transactional messages can be transferred up from lower-level nodes, through intermediate nodes, to higher-level nodes.

Application 201 can send transaction initiation commands to transaction manager 205, via logical communication link 202, to indicate a transaction is to be performed. Transaction manager 205 may communicate with appropriate resource managers using a two-phase commit protocol to maintain the atomicity of the transaction. This can include a prepare phase where transaction manager 205 sends prepare messages to resource managers identified as having resources necessary to the transaction (e.g., one or more of resource managers 221, 225, 231, and 235) and the identified resource managers respond by sending prepare complete messages to transaction manager 205.

When resource manager 221 and/or resource manager 225 manage a necessary resource, a prepare message may be transferred from transaction manager 205 to transaction manager 214 via logical communication link 212. Transaction manager 214 can in turn transfer the prepare message to resource manager 221 and/or resource manager 225, via corresponding logical communication link 243 and/or 244, as appropriate. Similarly, when resource manager 231 and/or resource manager 235 manage a necessary resource, a prepare message may be transferred from transaction manager 205 to transaction manager 217 via logical communication link 213. Transaction manager 217 can in turn transfer the prepare message to resource manager 213 and/or resource manager 235, via corresponding logical communication links 246 and/or 247, as appropriate.

When any of resource managers 221, 225, 231, or 235 receive a prepare message from transaction manager 205, and are in a state (or subsequently transition into a state) capable of performing operations requested in the prepare message, the resource manager can respond by sending a prepare complete message to transaction manager 205. Prepare complete messages may be transferred across the appropriate logical communications links and through transaction managers 215 and/or 217 to transaction manager 205. Thus, during a prepare phase, transaction manager 205 and any involved resource managers both send and receive at least one transactional message.

The two-phase commit can also a include a commit phase where transaction manager 205 sends commit messages to resource managers that have indicated capability to perform operations according to the transaction (e.g., one or more of resource managers 221, 225, 231, and 235). After performing the operations, these resource managers subsequently respond by sending commit complete messages to transaction manager 205. Further, these resource managers can also write log entries to corresponding logs (e.g., logs 224, 228, 234, or 238) to maintain a record of performed operations. Thus, during a commit phase, transaction manager 205 and any involved resource managers both send and receive at least one transactional message.

Transaction manager 205 can reconcile commit complete messages from any involved resource managers to generate an appropriate program response to send to application 201. Transaction manager 205 can also write a log entry to log 209 indicating that a transaction was committed.

It should be understood that the nodes in hierarchical tree 200 are not limited to being involved in a single transaction. It would be apparent to one skilled in the art, after having reviewed this description, that the nodes in hierarchical tree 200 may at any time be involved in a plurality of independent transactions. Further, it would be apparent to one skilled in the art, after having reviewed this description, that these independent transactions can involve the same or different nodes. Further, it would be apparent to one skilled in the art, after having reviewed this description, that a node in hierarchical tree 200 may be at a different point in a two-phase commit process with respect to each independent transaction.

For example, transaction manager 205 may be involved in a first transaction with resource managers 221 and 231 and may have just sent a commit message to resource managers 221 and 231. Before the first transaction completes, transaction manager 205 may receive transaction initiation commands from application 201 indicating that resources managed by resource managers 231 and 235 are necessary for a second transaction. Transaction manager may send a prepare message to resource managers 231 and 235 and move forward with the second transaction. If for some reason the first transaction is delayed, the second transaction may be completed without effecting the first transaction.

It should also be understood that hierarchical tree 200 is merely an example of one possible arrangement of nodes. It would be apparent to one skilled in the art, after having reviewed this description, that the principles of present invention can be practiced with nodes in virtually any configuration. Further, the nodes in hierarchical tree 200 may be in communication with one or more other transaction managers (e.g., transaction managers 260 and 280) and one or more other resource managers (e.g., resource manager 270) (hereinafter collectively referred to as "other nodes"). Nodes in hierarchical tree 200 can communicate with other nodes via corresponding logical communication links, such as, for example, logical communication links 266, 267, and 276. The nodes in hierarchical tree 200 may be involved in transaction with these other nodes. At times, a first node in hierarchical tree 200 (e.g., transaction manager 217) may be involved in a transaction with other nodes (e.g., transaction manager 280) simultaneous to being involved in a transaction with a second node in hierarchical tree 200 (e.g., resource manager 235).

It should also be understood that the nodes in hierarchical tree 200 are not limited to receiving transaction initiation commands from application 201. It would be apparent to one skilled in the art, after having reviewed this description, that one or more other applications (e.g., application 203), in addition to application 201 may send transaction initiation commands to nodes in hierarchical tree 200. For example, application 203 may send commands to transaction manager 217 via logical communication link 268. Further, it would be apparent to one skilled in the art, after having reviewed this description, that nodes other than transaction manager 205 (e.g., transaction managers 214, 217, 260 and 280) may receive transaction initiation commands from an application.

Transactional messages transferred between nodes (whether they be nodes of hierarchical tree 200 (or other nodes) can be associated with virtual time values. These virtual time values can indicate to a node when a particular message was sent and/or received relative to other transactional messages sent from and/or received at the node. Each node can maintain a virtual time value. For example, transaction manager 205 maintains virtual time value 207 and resource manager 235 maintains virtual time value 237. When a node sends and/or receives a transactional message the node can associate its virtual time value with the transactional message. For example, when transaction manager 217 sends a transactional message to resource manager 231, transaction manager 217 may associate virtual time value 219 with the transactional message. Resource manager 231 can retrieve this virtual time value to determine when the transactional message was received relative to other transactional messages. In some embodiments, nodes associate virtual time values with transactional messages by including virtual time stamps in transactional messages.

Log entries can also be associated with virtual time values. When a node (whether a node of a hierarchical tree 200 or any other node) writes a log entry, the node can associate its virtual time with the log entry. For example, when resource manager 270 writes a log entry to log 273, resource manager 270 may associate the virtual time value 271 with the log entry. It may be that nodes associate virtual times with log entries by including virtual time stamps in log entries.

Virtual time values can be maintained according to specified rules. In some embodiments, virtual time values are numerical values that are manipulated according to the specified rules. Specified rules can indicate that a node is to increment a virtual time value (e.g., by adding one to the virtual time value) after writing a log entry. For example, transaction manager 217 may write a first log entry to log 253 when virtual time value 219 equals 23. Virtual clock module 218 may include a virtual time stamp in the first log entry indicating the first log entry was written to the log at a virtual time of 23. Virtual clock module 218 may then increment virtual time value 219 from 23 to 24. When transaction manager 217 writes a subsequent second log entry to log 253, virtual clock module 218 may include a virtual time stamp in the second log entry indicating that the second log entry was written to the log at a virtual time of 24. Thus, it can more easily be determined, based on the virtual time value, that the second log entry was written to log 253 after the first log entry.

Specified rules can also indicate that virtual times are to be maximized. When a received transactional message is associated with a virtual time value greater than the virtual time value of a node, the virtual time value of the node can be set equal to the virtual time value associated with the transactional message. For example, when resource manager 235 receives a transactional message including a virtual time value of 50, virtual clock module 236 may compare 50 to virtual time value 237. If virtual time value 237 is less than 50, virtual clock module 236 may set virtual time value 237 equal to 50. However, when a received transactional message is associated with a virtual time value less than or equal to the virtual time value of a node, the virtual time value of the node is not set equal to the virtual time value associated with the transactional message. In the immediately preceding example, if virtual time value 237 is greater than or equal to 50 (e.g., 60), virtual clock module 236 may not modify virtual time value 237.

In some embodiments, both incrementing virtual time values and maximizing virtual time values are implemented among a plurality of nodes that are communicatively connected. For example, incrementing and maximizing virtual time values can be implemented among the nodes illustrated in FIG. 2. Thus, if there is a transactional dependency between a plurality of nodes illustrated in FIG. 2 (e.g., each of the plurality of nodes participated in the same transaction), a common point in time (with respect the transaction) across a corresponding plurality of logs can more easily be identified. Log entries for the transaction with lower virtual time values are indicated as having occurred before log entries for the transaction with higher virtual time values. Likewise, log entries for the transaction with higher virtual time values are indicated as having occurred after log entries for the transaction with lower virtual time values.

Figure 3:
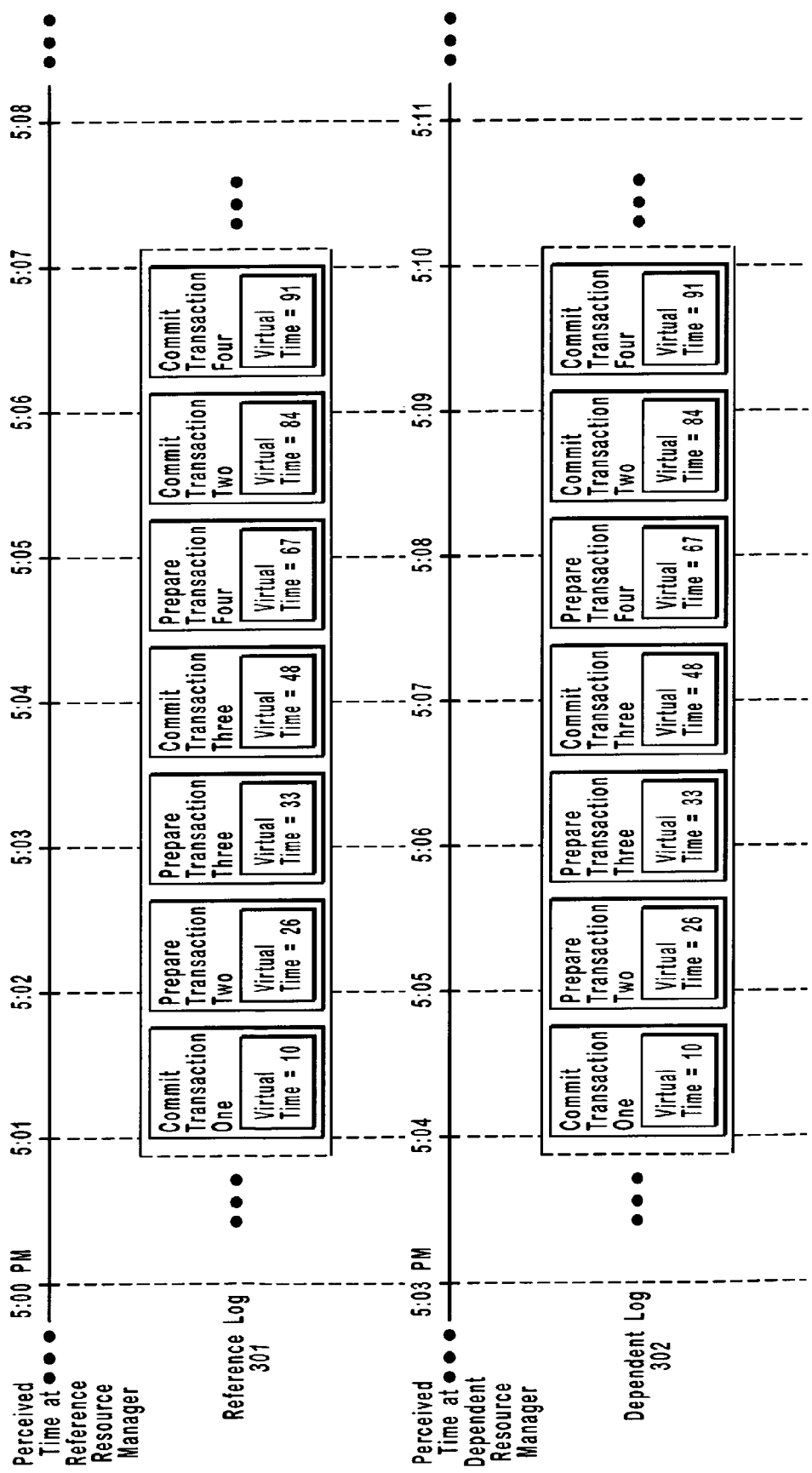
FIG. 3 is a first example of log entries from a reference log and log entries from a dependent log.

FIG. 3 is a first example of log entries from reference log 301 and log entries from dependent log 302. A "commit transaction" log entry indicates that a resource manager successfully performed operations associated with a transaction. A "prepare transaction" log entry indicates that a resource manager was prepared to perform operations associated with a transaction. Since, a single transaction can cause the performance of operations at a plurality of resource managers, both the reference resource manager and the dependent resource manager may prepare and perform operations associated with a transaction. Thus for any transaction, both the resource log and the dependent log may include log entries. For example, both reference log 301 and the dependent log 302 include a "commit transaction three" log entry. This indicates that both the reference resource manager and the dependent resource manager performed operations associated with transaction three. Likewise, both reference log 301 and the dependent log 302 include a "prepare transaction two" log entry. This indicates that both the reference resource manager and the dependent resource manager prepared operations associated with transaction two.

Shown in FIG. 3, is the "perceived time at reference resource manager" when the reference resource manager wrote log entries to reference log 301. For example, the reference resource manager perceived the time to be sometime very near 5:01 PM when a log entry committing operations associated with transaction one (the log entry "commit transaction one") was written to reference log 301. Also shown in FIG. 3, is the "perceived time at dependent resource manager" when the dependent resource manager wrote log entries to dependent log 302. For example, the dependent resource manager perceived the time to be sometime very near 5:04 PM when a log entry committing operations associated with transaction (the log entry "commit transaction one") one was written to dependent log 302.

The text "virtual time=" represents a virtual time stamp that is included in each log entry of reference log 301 and dependent log 302. The number associated with each virtual time stamp represents the virtual time value when a log entry was written to a log. For example, a log entry including the text "virtual time=26" indicates that the log entry was written to the log at a virtual time value of 26.

Figure 5:
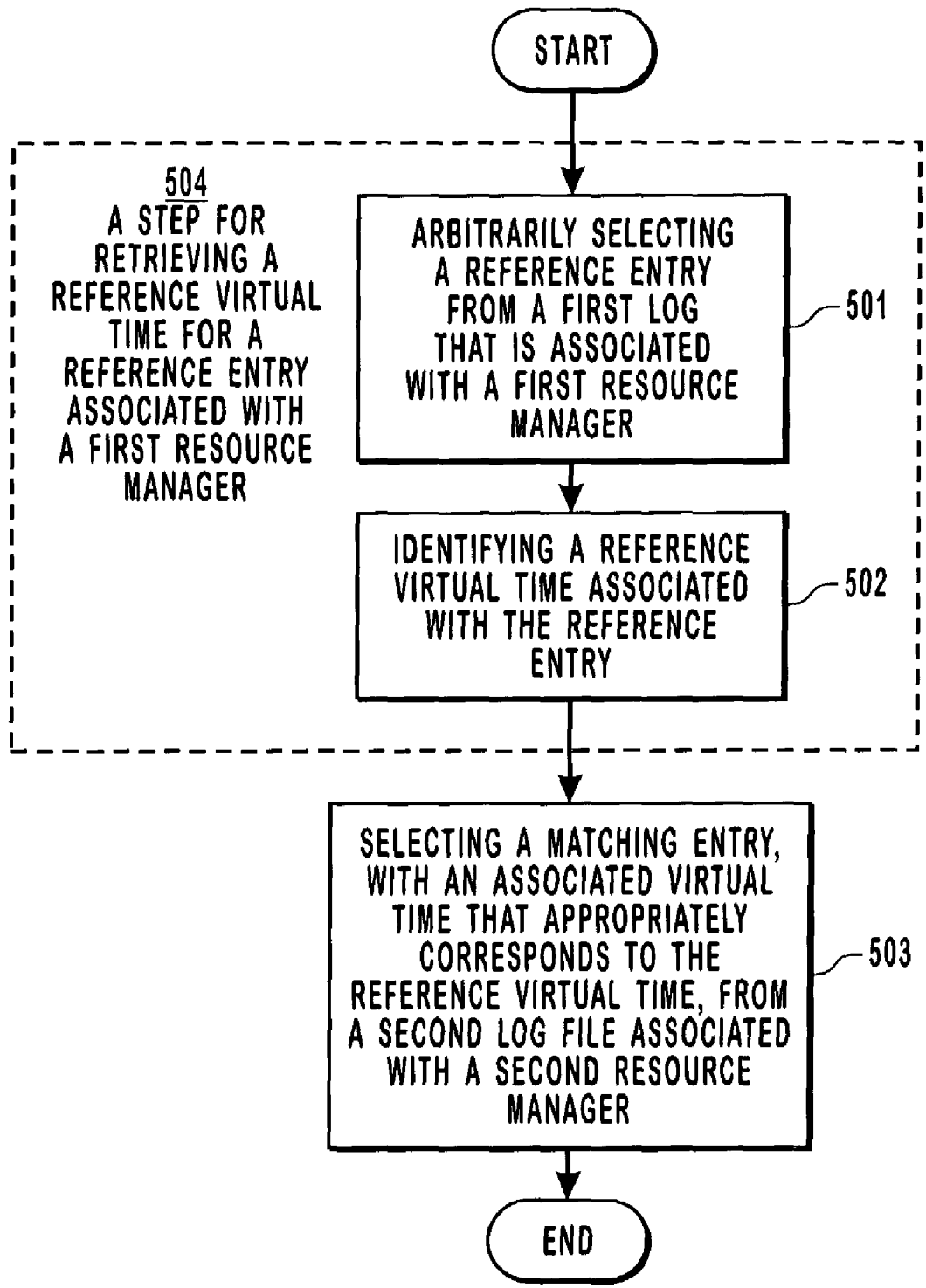
FIG. 5 is a flow diagram illustrating an example of a method for identifying a common point in time across a plurality of logs.

FIG. 5 is a flow diagram illustrating an example of a method for identifying a common point in time across a plurality of logs. The method of FIG. 5 will be discussed with reference to the functional components of FIG. 2 and the log entries of FIG. 3.

The method in FIG. 5 includes a functional, result-oriented step for retrieving a reference virtual time for a reference entry associated with a first resource manager (step 504). Step 504 may include any corresponding acts for accomplishing the result of retrieving a reference virtual time for a reference entry associated with a first resource manager. However, in the illustrated example of FIG. 5, the step 504 includes a corresponding act of arbitrarily selecting a reference entry from a first log that is associated with a first resource manager (act 501).

Act 501 can include selecting an entry from reference log 301. For the purposes of a query, it may be desirable for a plurality of resource managers to be returned to a previous common point in time. For example, it may be desirable to return the reference resource manager and one or more other resource managers to states immediately after the resource manager committed operations associated with transaction three. Thus, the "commit transaction three" log entry can be selected from reference log 301. In preparation for the query, the reference resource manager can be caused to roll-forward by processing the reference log up to the "commit transaction three" log entry.

In the illustrated example of FIG. 5, the step 504 also includes a corresponding act of identifying a reference virtual time associated with the reference entry (act 502). This can include identifying a virtual time that is included in a virtual time stamp. For example, the "commit transaction three" log entry from reference log 301 includes the virtual time value of 48 as indicated by its virtual time stamp. This virtual time value of 48 can be used as the reference virtual time.

To prepare for a query, log entries from one or more other resource managers, including the dependent resource manager, may need to be identified so that the other resource managers can be appropriately rolled-forward. The method of FIG. 3 includes an act of selecting a matching entry, with an associate virtual time that appropriately corresponds to the reference virtual time, from a second log associated with a second resource manager (act 503). An associated virtual time that appropriately corresponds to the reference virtual time may be a virtual time that equals the reference virtual time. For example, the "commit transaction three" log entry in dependent log 302 is associated with the virtual time value of 48 as indicated by its virtual time stamp. Thus, when the reference virtual time is 48, the "commit transaction three" log entry in dependent log 302 can be selected as a matching entry. Matching entries can be selected from logs associated with other resource managers in a manner similar to selection from dependent log 302.

However, it should be understood that an associated virtual time need not equal the reference virtual time to be an appropriately corresponding virtual time. It would be apparent to one skilled in the art, after having reviewed this description, that there are any number of ways, in addition to equaling the reference time value, to identify an appropriately corresponding virtual time. For example, an appropriately corresponding virtual time value may be the highest virtual time value that is less than the reference virtual time. When a reference virtual time is 12, a virtual time value of 8 may be an appropriately corresponding time value if no other virtual time value in a log is greater than 8 and less than 12. In still other cases, entries from a number of different logs (e.g., logs of other resource managers or transaction managers) are analyzed to determine an appropriately corresponding virtual time from a log.

This can occur, for example, when a resource manager's log does not provide the resource manager with enough information to determine if a transaction was committed or aborted. Thus, the resource manager is "in-doubt" as to whether or not the transaction was committed. When this occurs a transaction resource can provide the outcome from its log to the resource manager. If the log from the transaction manager indicates that the transaction was committed, the resource manager can commit the transaction. On the other hand, if the log from the transaction manager indicates that the transaction was aborted, the resource manager can abort the transaction. If the transaction manager is in-doubt, the transaction manager may poll other resource managers to determine if the other resource managers committed the transaction. For example, in a transaction involving operations at resource managers 221, 225, 231, and 235, transaction manager 205 may poll resource managers 221, 225, and 231 if resource manager 235 is in-doubt as to the outcome of the transaction.

Alternately, when a resource manager is in-doubt, the resource manager can poll other resource managers directly. For example, when resource manager 235 is in-doubt resource manager 235 can poll resource managers 221, 225, and 231 (without using transaction manager 205, or any other transaction manager, as an intermediary). However, whether a resource manager or transaction manager is doing the polling, one of at least three different results may occur.

First, if one of resource managers 221, 225, and 231 has committed the record (as indicated in a corresponding log 224, 228, or 234) then resource manager 235 (as well as any other resource managers that are in-doubt) also commits the transaction. Second, if none of the resource managers 221, 225, and 231 have committed the record (as indicated in corresponding logs 224, 228, and 234) and at least one of resource managers 221, 225, and 231 has either no outcome or an abort (as indicated in a corresponding log 224, 228, or 234) then resource manager 235 (as well as other resource managers that may be in-doubt) aborts the transaction. Third, if each of 221, 225, and 231 have prepare records in corresponding logs 221, 225, and 231, the transaction can be aborted or committed according to some pre-determined response. A pre-determined response can include committing the transaction, aborting the transaction, or referring to the log of a transaction manager.

Since resource managers may be polled about transactions, the resource managers may for some time store an indication of the outcome of transactions. An additional "forget phase" can be added to a two-phase commit protocol to indicate to a resource manager when it is no longer necessary to store an indication about the outcome of transaction. After writing a commit entry for a transaction, a transaction manager can send a forget transactional message (hereinafter referred to as a "forget message") to each resource manager involved in the transaction. Upon receiving the forget message, a resource manager can write a forget entry to a corresponding log. Then, when the corresponding log is subsequently processed, the forget entry indicates to the resource manager that it no longer needs to store an indication of the outcome of the transaction associated with the forget entry.

Virtual times may establish a correct ordering a log entries between different logs when use of perceived real times would not establish a correct ordering of entries between different logs. For example, were the reference resource manager and dependent resource manager rolled-forward to 5:07 PM, inconsistencies between the resource managers could result. The "prepare transaction four," "commit transaction two," and "commit transaction four" log entries would be processed from reference log 301 but would not be processed from dependent log 302. This would violate the atomicity property of transactions. A roll-forward to 5:07 PM would result in some of the operations associated with transaction two and transaction four being committed (the operations from reference log 301) while other operations associated with transaction two and transaction four would not being committed (the operations from dependent log 302)). However, as the "commit transaction three" entry from reference log 301 and the "commit transaction three" entry dependent log 302 both correspond to the same virtual time, the chance of any inconsistencies during a roll-forward is reduced.

Figure 4:
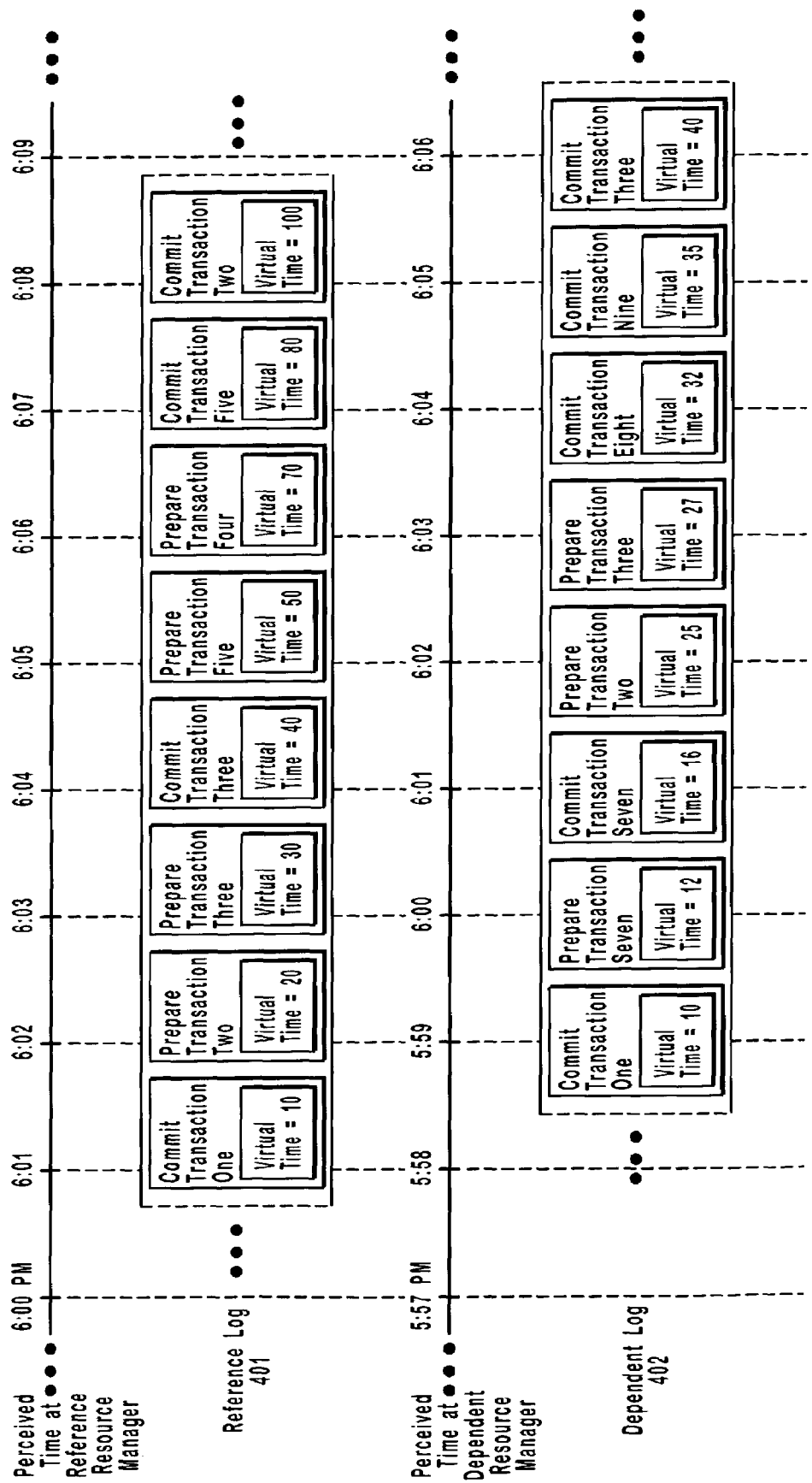
FIG. 4 is a second example of log entries from a reference log and log entries from a dependent log.

In some environments not all nodes will be involved in the same transactions. Illustrated in FIG. 4 is a second example of log entries from reference log 401 and log entries from dependent log 402. Reference log 401 and dependent log 402 include some log entries for the same transactions (e.g., transactions one, two, and three). This indicates that both the reference resource manager and the dependent resource manager were/are involved in these transactions. However, reference log 401 includes log entries for some transactions (e.g. transactions four and five), while dependent log 402 does not include log entries for these transactions. Likewise, dependent log 402 includes entries for still other transactions (e.g., transactions seven, eight, and nine), while dependent log 402 does not include log entries for these other transactions. This indicates that the reference resource manager and the dependent resource manager were/are also involved in different transactions.

Figure 6:
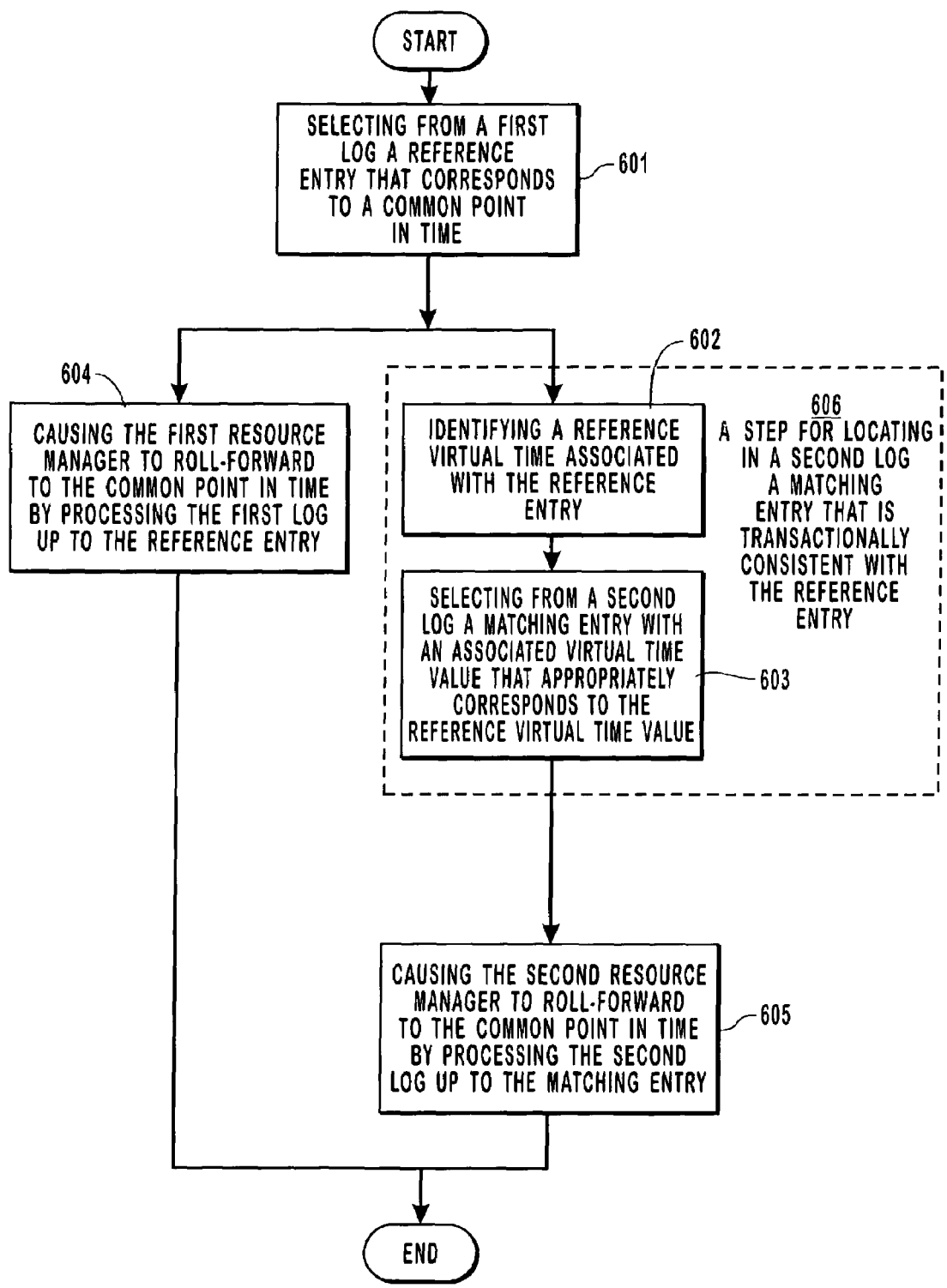
FIG. 6 is a flow diagram illustrating an example of a method for rolling a plurality of resource managers forward to a common point in time.

FIG. 6 is a flow diagram illustrating an example of a method for rolling a plurality of resource managers forward to a common point in time. The method of FIG. 6 will be discussed with reference to the functional components of FIG. 2 and the log entries of FIG. 4.

The method in FIG. 6 includes an act of selecting from a first log a reference entry that corresponds to a common point in time (act 601). It may be that a plurality of logs for a plurality of resource managers are maintained at a storage location that is external to the plurality of resource managers. A computer system with access to the external storage location may process the plurality of logs to identify a common point in time. A reference entry that corresponds to a common point in time can be identified from one of the logs at the external storage location, such as, for example, reference log 401. Reference log 401 may be the log of a resource manager, such as, for example, log 234 of resource manager 231. It may be desirable for resource manager 231 to roll-forward to a common point in time with other resource managers (e.g., resource manager 235) as part of a recovery process.

A reference entry corresponding to a common point in time can be an entry specified by a user and/or application program. For example, it may be specified that the reference resource manager is to roll-forward through all log entries written to reference log 401 before the time the reference resource manager perceived to be 6:04 PM. In this case, the "commit transaction three" log entry may be selected as a reference entry form reference log 401.

The method in FIG. 6 includes a functional, result-oriented step for locating in a second log a matching entry that is transactionally consistent to the reference entry (step 606). Step 606 may include any corresponding acts for accomplishing the result of locating in a second log a matching entry that is transactionally consistent to the reference entry. However, in the illustrated example of FIG. 6, the step 606 includes a corresponding act of identifying a reference virtual time associated with the reference entry (act 602). Act 602 can include identifying a virtual time value included in a virtual time stamp of the reference entry. For example in reference log 401, a virtual time of 40 is included in the virtual time stamp of the "commit transaction three" log entry.

In the illustrated example of FIG. 6, the step 606 also includes a corresponding act of selecting from a second log a matching entry with an associated virtual time value that appropriately corresponds to the reference virtual time value (act 603). This can include identifying a matching entry from dependent log 402. For example, if the reference virtual time is 40, the "commit transaction three" entry from dependent log 402 may be identified. However, if for some reason the reference virtual time was 38, the "commit transaction nine" entry from dependent log 402 may be identified, since 35 is the highest virtual time value in dependent log 402 that is less than 38.

Parallel to step 606, the method illustrated in FIG. 6 includes an act of causing the first resource manager to roll-forward to the common point in time by processing the first log up to the reference entry (act 604). This can include processing reference log 401 up to the reference entry to cause the reference resource manager to roll-forward. For example, if the "commit transaction three" entry from reference log 401 were the reference entry, reference log 401 could be processed to this entry to cause the reference resource manager to roll-forward to the common point in time.

The method illustrated in FIG. 6 includes an act of causing the second resource manager to roll-forward to the common point in time by processing the second log up to the matching entry (act 605). This can include processing dependent log 402 up to the matching entry to cause the dependent resource manager to roll-forward. For example, if the "commit transaction three" entry from dependent log 402 were the matching entry, dependent log 402 could be processed to this entry to cause the dependent resource manager to roll-forward to the common point in time.

Figure 7:
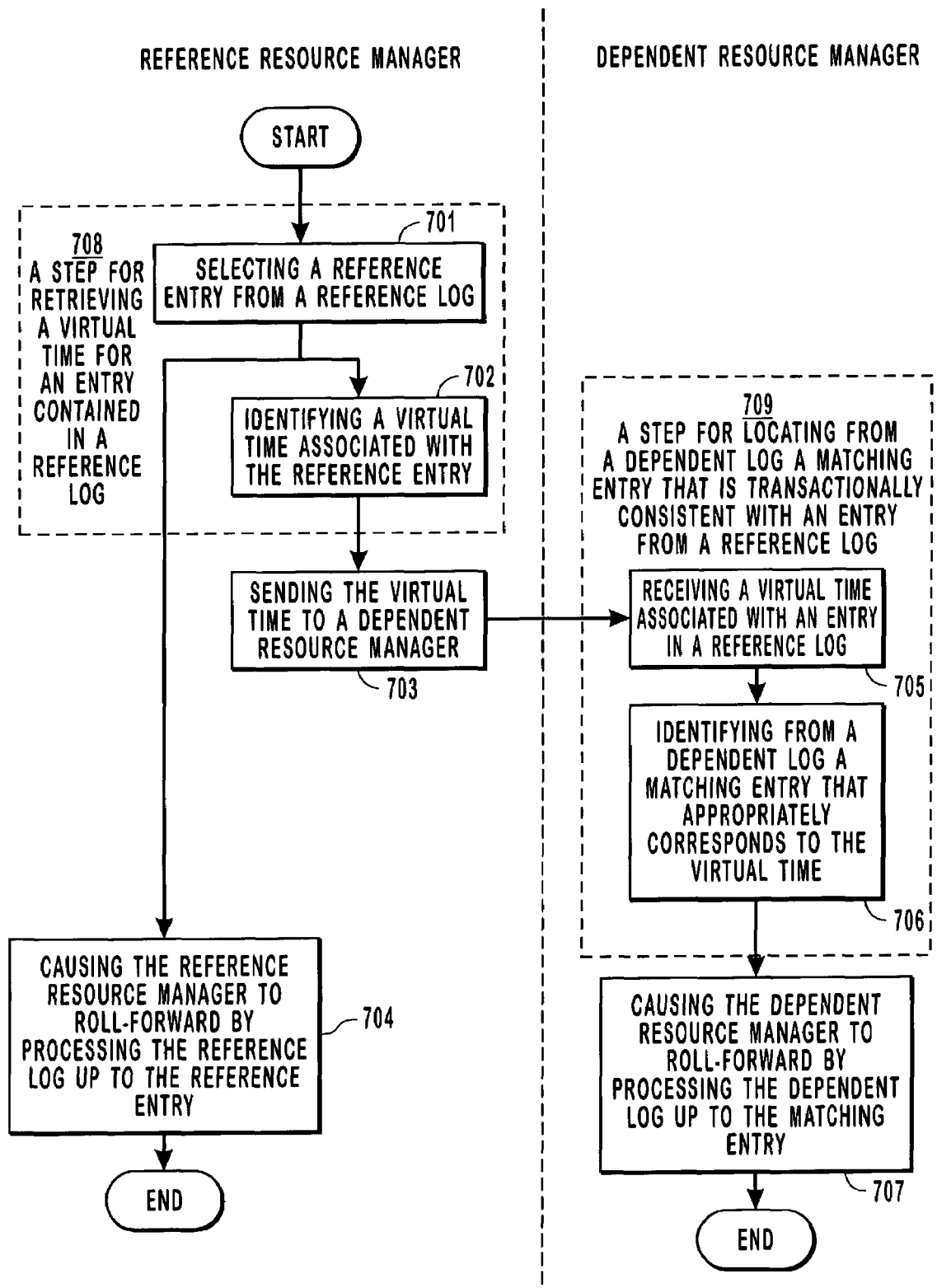
FIG. 7 is a flow diagram illustrating an example of a method for a reference resource manager to cause a dependent resource manager to roll-forward to a point in time identified by the reference resource manager.

In some embodiments, more than one computer system accesses logs for different resource managers. FIG. 7 is a flow diagram illustrating an example of a method for a reference resource manager to cause a dependent resource manager to roll-forward to a point in time identified by the reference resource manager.

The method in FIG. 7 includes a functional, result-oriented step for retrieving a virtual time for an entry contained in a reference log (step 708). Step 708 may include any corresponding acts for accomplishing the result of retrieving a virtual time for an entry contained in a reference log. However, in the illustrated example of FIG. 7, the step 708 includes a corresponding act of selecting a reference entry from a reference log (act 701). This can include a user and/or application program selection as previously described.

In the illustrated example of FIG. 7, the step 708 also includes a corresponding act of identifying a virtual time associated with the reference entry (act 702). This can include identifying a virtual time included in a virtual time stamp.

The method in FIG. 7 also includes an act of sending the virtual time to a dependent resource manager (act 703). This can include, for example, resource manager 221 (a reference resource manager) sending a virtual time to resource manager 225 (a dependent resource manager).

The method in FIG. 7 includes a functional, result-oriented step for locating from a dependent log a matching entry that is transactionally consistent to an entry from a reference log (step 709). Step 709 may include any corresponding acts for locating a matching entry. However, in the illustrated example of FIG. 7, the step 709 includes a corresponding act of receiving a virtual time associated with an entry in a reference log (act 705). This can include, for example, resource manager 225 (a dependent resource manager) receiving a virtual time from resource manager 221 (a reference resource manager).

In the illustrated example of FIG. 7, the step 709 also includes identifying from a dependent log a matching entry that appropriately corresponds to the virtual time (act 706). This can include identifying a matching entry with a virtual time value that appropriately corresponds to the received virtual time value. An appropriately corresponding time value can be identified from a virtual time stamp.

The method in FIG. 7 includes an act of causing the reference resource manager to roll-forward by processing the reference log up to the reference entry (act 704). This can include the reference resource manager processing log entries that are stored at the reference resource manager to cause the reference resource manager to roll-forward.

The method in FIG. 7 includes an act of causing the dependent resource manager to roll-forward by processing the reference log up to the matching entry (act 707). This can include the dependent resource manager processing log entries that are stored at the dependent resource manager to cause the dependent resource manager to roll-forward.

Virtual times can be used to increase the chance of identifying a common point in time across a plurality of logs. This in turn increases the chance of rolling a plurality of resource managers forward to a common point in time during a roll-forward recovery.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United State Letters Patent is:

1. In a computer system that includes a plurality of logs, wherein each log contains a plurality of entries indicating transactions that have occurred at an associated resource manager, and wherein each entry in a log is associated with a virtual time value that represents the virtual time a transaction occurred, a method for selecting chronologically consistent entries contained in two or more logs so as to increase the chances of associated resource managers being in transactionally consistent states if the two or more logs are subsequently processed to bring the associated resource managers to a specified time, the method comprising:

an act of arbitrarily selecting a reference entry from a first log that is associated with a first resource manager, wherein the reference entry is written to the first log by the first resource manager upon receiving a transactional message from a transactional manager, and which is associated with an atomic transaction and that includes a virtual time;

an act of the first resource manager maximizing a reference virtual clock value of the first resource manager by updating the reference virtual clock value to be equal to the virtual time that is included in the received transactional message if the virtual time is greater than the reference virtual clock value when the transactional message is received, using the reference virtual clock value as a reference virtual time value that is associated with the reference entry in the first log;

subsequent to selecting the reference entry from the first log, an act of identifying the reference virtual time value that is associated with the arbitrarily selected reference entry in the log; and wherein the reference virtual time value that was found to be associated with the selected reference entry is subsequently used for an act of selecting a matching entry, with an associated virtual time value that appropriately corresponds to the reference virtual time value, from a second log that is associated with a second resource manager.

2. The method as recited in claim 1, wherein the act of arbitrarily selecting a reference entry from a first log that is associated with a first resource manager comprises the following:

an act of selecting an entry from a log of a resource manager associated with a file system.

3. The method as recited in claim 1, wherein the act of arbitrarily selecting a reference entry from a first log that is associated with a first resource manager comprises the following:

an act of selecting an entry from a log of a resource manager associated with a database.

4. The method as recited in claim 1, wherein the act of arbitrarily selecting a reference entry from a first log that is associated with a first resource manager comprises the following:

an act of a user selecting a reference entry from a first log that is associated with a first resource manager.

5. The method as recited in claim 1, wherein the act of arbitrarily selecting a reference entry from a first log that is associated with a first resource manager comprises the following:

an act of an application program selecting a reference entry from a first log that is associated with a first resource manager.

6. The method as recited in claim 1, wherein the act of arbitrarily selecting a reference entry from a first log that is associated with a first resource manager comprises the following:

an act of selecting an entry that was written to the first log as a result of the first resource manager being involved in a two-phase commit.

7. The method as recited in claim 1, wherein the set of identifying a reference virtual time value associated with the reference entry comprises the following:

an act of identifying a virtual time value included in a virtual time stamp.

8. The method as recited in claim 1, wherein the act of identifying a reference virtual time value associated with the reference entry comprises the following:
   an act of identifying a reference virtual time value contained in the reference log.

9. The method as recited in claim 1, wherein the act of selecting a matching entry, with an associated virtual time value that appropriately corresponds to the reference virtual time value, from a second log associated with a second resource manager comprises the following:
   an act of selecting a matching entry that includes a virtual time stamp with a virtual time value that appropriately corresponds to the reference virtual time value.

10. The method as recited in claim 1, wherein the act of selecting a matching entry, with an associated virtual time value that appropriately corresponds to the reference virtual time value, from a second log associated with a second resource manager comprises the following:
   an act of selecting a matching entry associated with a virtual time value that equals the reference virtual time value.

11. The method as recited in claim 1, wherein the act of selecting a matching entry, with an associated virtual time value that appropriately corresponds to the reference virtual time value, from a second log associated with a second resource manager comprises the following:
   an act of selecting a matching entry associated the greatest virtual time value in the second log that less than reference virtual time value.

12. The method as recited in claim 1, wherein the act of selecting a matching entry, with an associated virtual time value that appropriately corresponds to the reference virtual time value, from a second log associated with a second resource manager comprises the following:
   an act of selecting a matching entry based on an indication that a third log includes a log entry for committed operations associated with a transaction represented in the matching entry.

13. The method as recited in claim 1, wherein the act of selecting a matching entry from a second log associated with a second resource manager comprises the act of:
   an act of selecting a matching entry from the log of a resource manager that is associated with a file system.

14. The method as recited in claim 1, wherein the act of selecting a matching entry from a second log associated with a second resource manager comprises the act of:
   an act of selecting a matching entry from the log of a resource manager that is associated with a database.

15. The method as recited in claim 1, wherein the act of selecting a matching entry from a second log associated with a second resource manager comprises the act of:
   an act of selecting a matching entry that was written to the second log as a result of the second resource manager being involved in a two-phase commit.

16. The method as recited in claim 1, further comprising:
   an act of the first resource manager writing the reference entry to the first log as part of a two-phase commit; and
   an act of the second resource manager writing the matching entry to the second log as part of the two-phase commit.

17. The method as recited in claim 16, wherein the act of the first resource manager writing the reference entry to the first log as part of a two-phase commit comprises the following:
   an act of the first resource manager receiving a transactional message that includes a virtual time value.

18. The method as recited in claim 17, wherein the act of the second resource manager writing the matching entry to the second log as part of the two-phase commit comprises the following:
   an act of the second resource manager receiving a transactional message that includes the virtual time value.

19. A method as recited in claim 1, the method further comprising:
   an act of causing the first resource manager to roll-forward to a common point in time by processing the first log up to the reference entry; and
   an act of causing a second resource manager to roll-forward to the common point in time by processing a second log up to a matching entry.

20. The method as recited in claim 19, wherein the act of selecting from the first log file a reference entry that corresponds to the common point in time comprises the following:
   an act of selecting a reference entry based on the perceived real time at a first resource manager when the reference entry was written to the first log.

21. The method as recited in claim 19, wherein the act of identifying a reference virtual time value associated with the reference entry comprises the following:
   an act of identifying a virtual time value included in a virtual time stamp.

22. The method as recited in claim 21, wherein the act of selecting from the second log a matching entry having an associated virtual time value that appropriately corresponds to the reference virtual time value comprises the following:
   an act of selecting a matching entry having a virtual time stamp that includes the associated virtual time value.

23. The method as recited in claim 19, wherein the act of causing the first resource manager to roll-forward to the common point in time by processing the first log up to the reference entry comprises the following:
   an act of the first resource manager receiving a command from the computer system that causes the first resource manager to process the first log up to the reference entry.

24. The method as recited in claim 19, wherein the act of causing the second resource manager to roll-forward to the common point in time by processing the second log up to the matching entry comprises the following:
   an act of the second resource manager receiving a command from the computer system that causes the second resource manager to process the second log up to the matching entry.

25. The method as recited in claim 19, further comprising:
   an act of the first resource manager writing the reference entry to the first log as part of a two-phase commit; and
   an act of the second resource manager writing the matching entry to the second log as part of the two-phase commit.

26. A method as recited in claim 1, the method further comprising:
   an act of causing the reference resource manager to roll-forward by processing the reference log up to the reference entry.

27. A computer program product for use in a computer system that includes a plurality of logs, wherein each log contains a plurality of entries indicating transactions that have occurred at an associated resource manager, and wherein each entry in a log is associated with a virtual time value that represents the virtual time a transaction occurred, the computer program product for implementing a method for selecting chronologically consistent entries contained in two or more logs so as to increase the chances of associated resource managers being in transactionally consistent states if the two or more logs are subsequently processed to bring the associated resource managers to a specified time, the computer program product comprising:

one or more computer-readable media carrying computer-executable instructions, that when executed at the computer system, cause the computer system to perform the method recited in claim 1.

28. The computer program product as recited claim 27, wherein the one or more computer-readable media include physical storage media.

29. The computer program product as recited claim 27, wherein the one or more computer-readable media include system memory.

30. A computer program product as recited in claim 27, wherein the method further comprises:

causing the first resource manager to roll-forward to a common point in time by processing the first log up to the reference entry; and causing a second resource manager to roll-forward to the common point in time by processing a second log up to a matching entry.

31. The computer program product as recited claim 30, wherein the one or more computer-readable media include physical storage media.

32. The computer program product as recited claim 30, wherein the one or more computer-readable media include system memory.

33. A computer program product as recited in claim 27, wherein the method further comprises:

causing the reference resource manager to roll-forward by processing the reference log up to the reference entry.

34. The computer program product as recited claim 33, wherein the one or more computer-readable media include physical storage media.

35. The computer program product as recited claim 33, wherein the one or more computer-readable media include system memory.

36. A method as recited in claim 27, the method further including:

prior to rolling-forward to the matching entry, determining that it is in-doubt regarding whether or not a transaction corresponding to the matching entry was committed or aborted; and polling at least one of a transactional manager or another resource manager to determine whether the matching entry was committed or aborted, and prior to rolling-forward to the matching entry.

37. A method as recited in claim 1, further including adding a forget phase to a two-phase commit protocol corresponding to the transactional message, and wherein the forget phase includes storing an indication regarding an outcome of a transaction at the first resource manager.

38. A method as recited in claim 37, wherein the forget phase also includes, upon receiving a forget message, writing a forget entry to a corresponding log so that when the corresponding log is subsequently processed, the resource manager receives an indication that it is no longer necessary to store the indication of the outcome of the transaction associated with the forget entry.

39. In a dependent resource manager that maintains a dependent log, wherein the dependent log contains entries identifying transactions that have occurred at the dependent resource manager, a method for causing the dependent resource manager to be in a transactionally consistent state with a reference resource manager, the method comprising:

receiving a transactional message that is associated with an atomic transaction and that includes a virtual time;

making a log entry of the transactional message in a dependent log;

maximizing a virtual clock value of the dependent resource manager by determining whether the virtual time included in the received transactional message is greater than the virtual clock value of the dependent resource manager, and updating the virtual clock value of the dependent resource manager to be equal to the virtual time of the received transactional message if the virtual time of the received transactional message is greater than the virtual clock value of the dependent resource manager;

using the virtual clock value of the dependent resource manager as a virtual time value that is associated with an entry in the dependent log corresponding to the received transactional message; and an act of receiving a new virtual time associated with an entry contained in a reference log for which a transactionally consistent state of the dependent reference log is to be identified;

an act of identifying from the dependent log a matching entry that appropriately corresponds to the newly received virtual time; and an act of causing the dependent resource manager to roll-forward by processing the dependent log up to the matching entry, thereby moving the dependent log to the transactionally consistent state with the reference log.

40. A computer program product for use in a first resource manager that maintains a log, wherein the log contains entries identifying transactions that have occurred at the first resource manager, the computer program product for implementing a method for causing the first resource manager to be in a mutually transactionally consistent state with a second resource manager, the method comprising:

one or more computer-readable media carrying computer-executable instructions, that when executed at the first resource manager, cause the first resource manager to perform the method recited in claim 39.

41. The computer program product as recited claim 40, wherein the one or more computer-readable media include physical storage media.

42. The computer program product as recited claim 41, wherein the one or more computer-readable media include system memory.

* * * * *